(12) United States Patent
White

(10) Patent No.: US 10,423,756 B2
(45) Date of Patent: Sep. 24, 2019

(54) GEAR PHASING FOR NOISE CONTROL

(71) Applicant: Deere & Company, Moline, IL (US)

(72) Inventor: Robert J. White, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 379 days.

(21) Appl. No.: 15/337,649

(22) Filed: Oct. 28, 2016

(65) Prior Publication Data

US 2018/0121596 A1    May 3, 2018

(51) Int. Cl.
  *G06F 17/50* (2006.01)
  *F16H 57/00* (2012.01)

(52) U.S. Cl.
  CPC ..... *G06F 17/5086* (2013.01); *F16H 57/0006* (2013.01); *F16H 2057/0087* (2013.01); *G06F 17/5095* (2013.01); *G06F 2217/82* (2013.01)

(58) Field of Classification Search
  None
  See application file for complete search history.

(56) References Cited

U.S. PATENT DOCUMENTS

| | | | |
|---|---|---|---|
| 4,259,875 A | 4/1981 | Rouverol | |
| 5,406,863 A | 4/1995 | Korge | |
| 6,080,199 A * | 6/2000 | Umeyama | F16H 55/0806 29/893.3 |
| 8,425,362 B2 | 4/2013 | Huang | |
| 2011/0257901 A1* | 10/2011 | Bechhoefer | G01H 1/00 702/34 |

FOREIGN PATENT DOCUMENTS

| | | |
|---|---|---|
| CN | 201093048 Y | 7/2008 |
| CN | 102689054 A | 9/2012 |
| CN | 102878279 B | 7/2015 |

OTHER PUBLICATIONS

Liu, Gang, "Nonlinear Dynamics of Multi-Mesh Gear Systems", 2007, Dissertation, The Ohio State University. (Year: 2007).*
Tseng, Rui-Tang et al., "Contact Characteristics of Cylindrical Gears with Curvilinear Shaped Teeth", Apr. 6, 2004, Mechanism and Machine Theory, Elsevier Ltd. (Year: 2004).*
(Continued)

*Primary Examiner* — Cedric Johnson
(74) *Attorney, Agent, or Firm* — Klintworth & Rozenblat IP LLP

(57) ABSTRACT

A method for designing a gear train having first and second enmeshed gears includes performing a first analysis with the first and second gears in a first configuration. The first analysis includes determining a first transmission error (TE) characteristic of the first configuration, and providing a first geometric representation of the first TE characteristic. The method also includes performing a second analysis with the first and second gears in a second configuration. The second analysis includes determining a second TE characteristic of the second configuration and providing a second geometric representation of the second TE characteristic. Moreover, the method includes providing a comparison of the first and second TE characteristics by providing a comparison of the first and second geometric representations.

16 Claims, 8 Drawing Sheets

(56) References Cited

OTHER PUBLICATIONS

A. Kahraman et al., Planet Mesh Phasing in Epicyclic Gear Sets, General Motors Corporation, MI, USA, 1994.
W.E. Palmer et al., Noise Control in Planetary Transmissions, Detroit Diesel Allison, Division of General Motors, 1977.
D. L. Seager, Conditions for the Neutralization of Excitation by the Teeth in Epicyclic Gearing, Journal Mechanical Engineering Science, vol. 17, No. 5, 1975.
Robert G. Parker, A Physical Explanation for the Effectiveness of Planet Phasing to Suppress Planetary Gear Vibration, Journal of Sound and Vibration (2000) 236(4), 561-573, http://www.idealibrary.com, Dec. 2, 1999.
Prof. Christian Brecher et al., Analysis of Excitation Behavior of a Two-Stage Gearbox Based on a Validated Simulation Model, AGMA Technical Paper, ISBN 978-1-55589-121-3, Sep. 2016.
T.F. Conry et al., A Mathematical Programming Technique for the Evaluation of Load Distribution and Optimal Modifications for Gear Systems, Journal of Engineering for Industry, Nov. 1973.
M. Kubur et al., Dynamic Analysis of a Multi-Shaft Helical Gear Transmission by Finite Elements: Model and Experiment, Transactions of the ASME, vol. 126, Jul. 2004.
Cheon Gill-Jeong, Numerical Study on Reducing the Vibration of Spur Gear Pairs with Phasing, Journal of Sound and Vibration, www.elsevier.com/locate/jsvi, Accepted Apr. 6, 2010.

\* cited by examiner

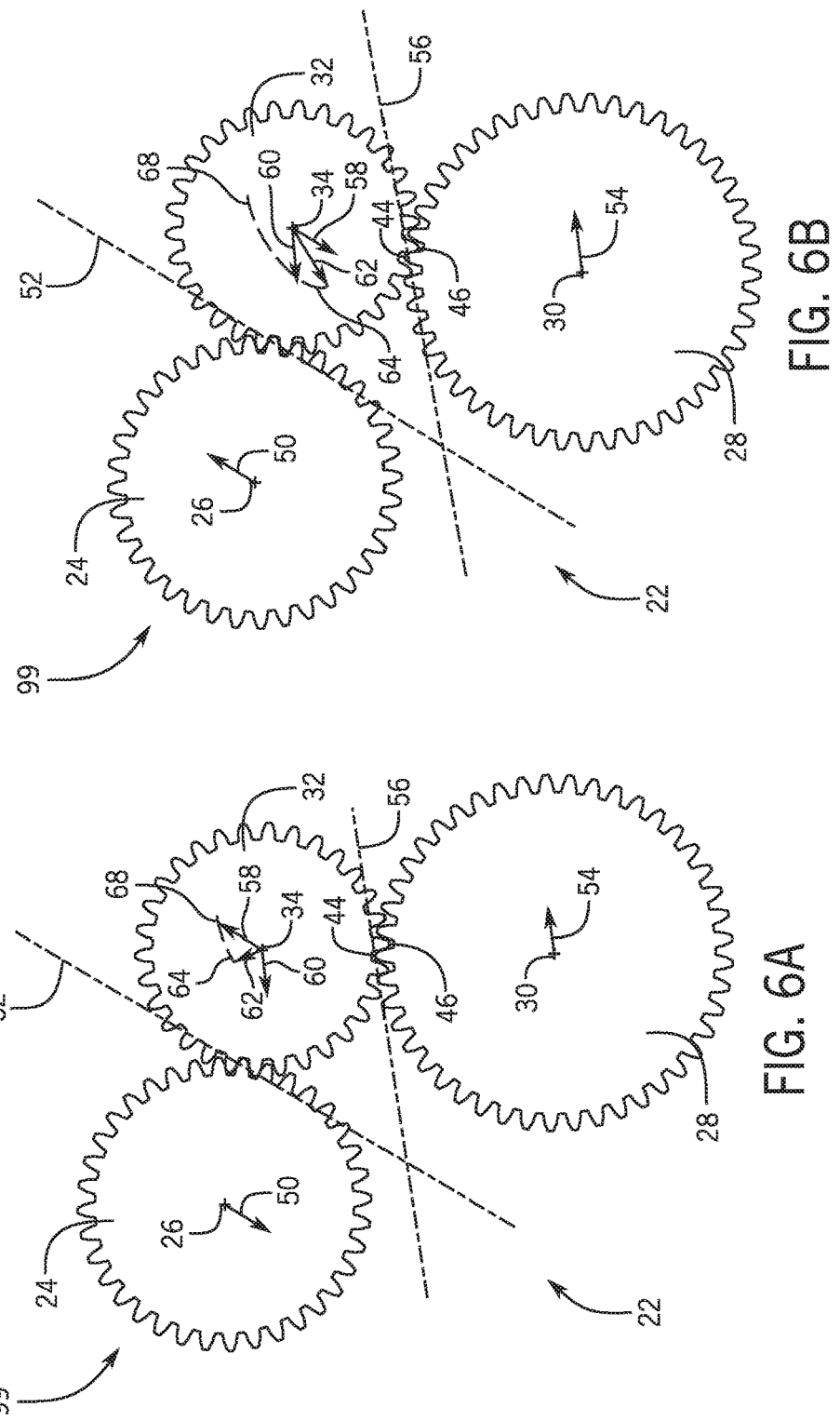

GEAR PHASING FOR NOISE CONTROL

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to gear design and, more particularly, to tools and methods for phasing a gear within a gear train for noise control.

BACKGROUND OF THE DISCLOSURE

Several types of machines include a gear train for transferring torque and power from an input shaft to an output shaft. For example, vehicles often include one or more gear trains that are supported within a drive assembly. Also, some final drive assemblies on work vehicles include a gear train for powering wheels, implements, and other devices.

Several factors may be considered when designing a gear train. For example, the desired gear ratio is important when designing a gear train. Also, the size constraints for the drive assembly may be a factor. Additionally, the amount of noise (e.g., gear whine and the like) produced by the drive assembly may be important. For example, some designers attempt to reduce and/or minimize the amount of noise produced by the drive assembly.

SUMMARY OF THE DISCLOSURE

This disclosure provides tools and methods for reducing noise output from a gear assembly by managing transmission error force vectors between multiple gears in a gear train.

In one aspect, the disclosure provides a method for designing a gear train. The method includes generating, with a modeling module, a model of a gear train having a first gear enmeshed with a second gear. The method also includes inputting, with an input device, a first variable to define a first configuration of the first and second gears in the gear train. Moreover, the method includes performing, with a processor, a first analysis of the first configuration. The first analysis includes determining a first transmission error (TE) characteristic of the first configuration of the first and second gears. Also, the method includes inputting, with the input device, a second variable to define a second configuration of the first and second gears in the gear train. Furthermore, the method includes performing, with the processor, a second analysis of the second configuration. The second analysis includes determining a second TE characteristic of the second configuration of the first and second gear. Additionally, the method includes providing, with the processor, a comparison of the first TE characteristic and the second TE characteristic. Performing the first analysis includes providing a first geometric representation of the first TE characteristic. Performing the second analysis includes providing a second geometric representation of the second TE characteristic. Also, providing a comparison of the first TE characteristic and the second TE characteristic includes providing a comparison of the first and second geometric representations.

In another aspect, the disclosure provides a computerized tool for designing a gear train having a first gear enmeshed with a second gear. The computerized tool includes an input device configured to receive a first user input related to a first configuration of the gear train and to receive a second user input related to a second configuration of the gear train. The computerized tool also includes a modeling module configured to generate a model of the first configuration of the gear train and to generate a model of the second configuration of the gear train. Moreover, the computerized tool includes a processor configured to perform a first analysis of the first configuration by determining a first transmission error (TE) characteristic of the first configuration of the gear train and providing a first geometric representation of the first TE characteristic. The processor is configured to perform a second analysis of the second configuration by determining a second TE characteristic of the second configuration of the gear train and providing a second geometric representation of the second TE characteristic. Additionally, the processor is configured to compare the first TE characteristic and the second TE characteristic by providing a comparison of the first and second geometric representations.

The details of one or more embodiments are set forth in the accompanying drawings and the description below. Other features and advantages will become apparent from the description, the drawings, and the claims.

BRIEF DESCRIPTION OF THE DRAWINGS

FIGS. 6A-6D are side views of the gear train of the drive assembly of FIG. 2, wherein a single tooth mesh of the gears is shown progressively from FIG. 6A to FIG. 6D;

Like reference symbols in the various drawings indicate like elements.

DETAILED DESCRIPTION

Figure 1:
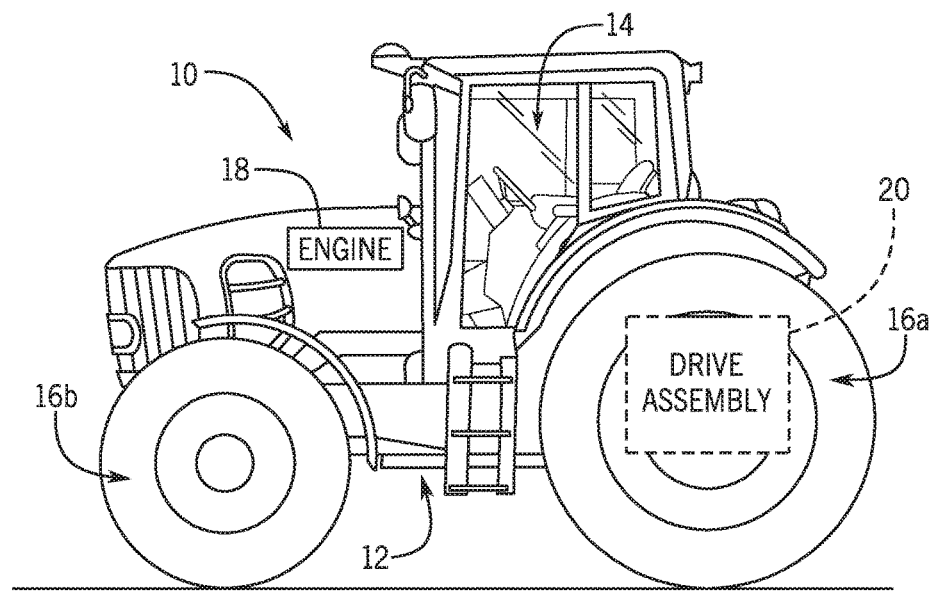
FIG. 1 is a side view of a work vehicle with an example drive assembly shown schematically.

The following describes one or more example embodiments of the disclosed tools and related methods for phasing a gear within a gear train for controlling noise, as shown in the accompanying figures of the drawings described briefly above. Various modifications to the example embodiments may be contemplated by one of skill in the art.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The following describes one or more example implementations of the disclosed tools and methods for phasing gears within a gear train. The disclosed tools and methods provide improved drive assemblies for different machines, as compared to conventional drive assemblies.

The present disclosure provides tools and methods for analyzing, designing, and/or improving a gear train based on one or more analyses of transmission error (TE) forces created during rotation of the gear train. The present disclosure may be employed for reducing noise, vibration, whine, and other types of audible and inaudible frequencies caused by TE forces.

As will be discussed, a model may be generated of a gear train. The TE forces of that gear train may be analyzed using that model. Also, the model may be used to determine the dynamic behavior of the vectors of the TE forces as the gears rotate.

In some embodiments, the gear train may be an idler set with an idler gear. The tools and methods of the present disclosure may be used to determine a vector sum of multiple TE force vectors at the idler gear. The change in the vector sum as the gears rotate may be determined to create a geometric representation of the TE forces. This geometric representation may be analyzed for phasing the TE forces within the gear train.

For example, the tools and methods of the present disclosure may be used to create models of two or more gear train configurations. At least one variable (e.g., number of gear teeth, tooth thickness, pressure angle, etc.) can be different in each configuration. The geometric representation of the TE forces for each configuration may be analyzed and compared against each other to determine which configuration produces the least excitation to the housing and, thereby, leads to a gearbox with less gear noise. For example, the analysis may be used for phasing of the TE forces within the gear train to, thereby, reduce the noise resulting from rotation of the gears.

In some embodiments, the methods and tools of the present disclosure may be employed to address and/or analyze fundamental frequencies of TE forces within a gear train. In additional embodiments, the methods and tools of the present disclosure may be employed to address and/or analyze higher harmonics.

With reference to the drawings, one or more example implementations of the tools and methods of the present disclosure will now be described. While a final drive assembly of a tractor is illustrated and described herein as an example drive assembly, one skilled in the art will recognize that principles of the tools and methods disclosed herein may be readily adapted for designing other types of drive assemblies. The tools and methods of the present disclosure may be used for designing a drive assembly of a vehicle (e.g., a work vehicle) as well as a drive assembly for a stationary machine. Also, the tools and methods of the present disclosure may be adapted for designing a drive assembly for a work vehicle other than a tractor, including for example, various crawler dozer, loader, backhoe and skid steer machines used in the construction industry, as well as various other machines used in the agriculture and forestry industries. As such, the present disclosure should not be limited to drive assemblies associated with tractors or the particular examples shown and described.

FIG. 1 illustrates a work vehicle 10. Although the work vehicle 10 illustrated in FIG. 1 is a tractor, it will be appreciated that the present disclosure applies to other work vehicles. The work vehicle 10 may include a frame 12 that supports an operator cabin 14. The frame 12 is supported by a plurality of wheels, such as a set of rear wheels 16a and a set of front wheels 16b.

In some embodiments, the work vehicle 10 may include an engine 18, such as an internal combustion engine. The work vehicle 10 may also include a drive assembly 20, which is illustrated schematically in FIG. 1. The drive assembly 20 may be operably coupled to the engine 18 (e.g., via a shaft, via a transmission, etc.) such that the engine 18 delivers torque and power to the drive assembly 20. As represented in FIG. 1, the drive assembly 20 may be a final drive assembly for at least one of the rear wheels 16a. However, it will be appreciated that the drive assembly 20 may be operably coupled to other components of the work vehicle 10 without departing from the scope of the present disclosure.

Figure 2:
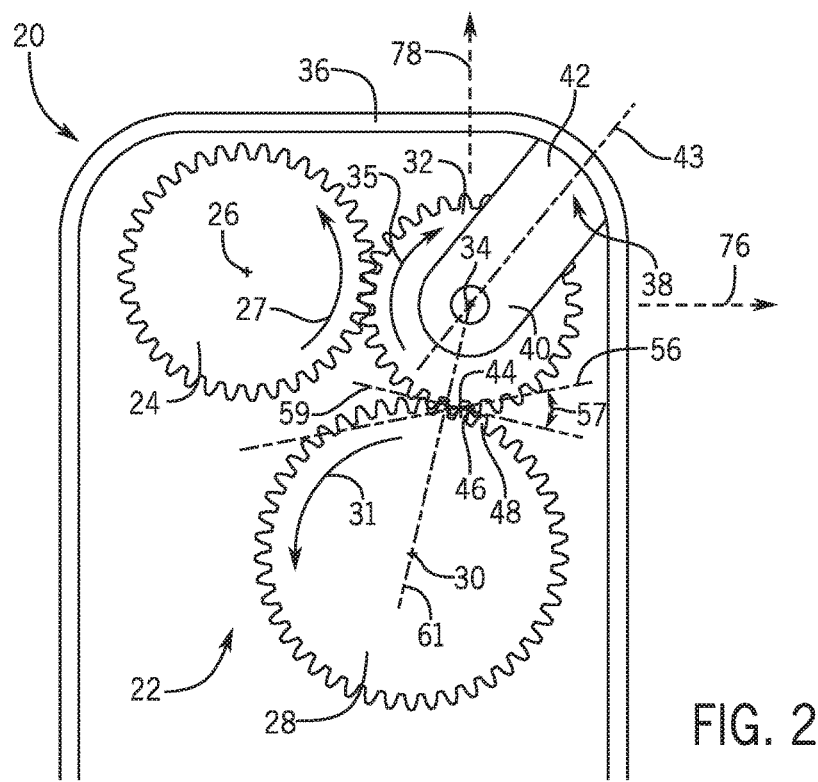
FIG. 2 is a side view of the example drive assembly of FIG. 1.

Referring now to FIG. 2, the drive assembly 20 will be discussed in greater detail according to example embodiments. As shown, the drive assembly 20 may include a gear train 22, which includes an input gear 24, an output gear 28, and an idler gear 32. It will be appreciated that the illustrated gear train 22 is an example and that the gear train 22 may vary from the illustrated configuration.

The input gear 24 may be of any suitable type (e.g., a spur gear, a helical gear, a double helical gear, etc.). Also, the input gear 24 may rotate about an input axis of rotation 26. The input gear 24 may rotate counterclockwise as indicated by arrow 27 in FIG. 2. The input gear 24 may be fixed for rotation with an input or drive shaft (not shown). The input shaft receives torque and power from the engine 18 (FIG. 1) to thereby drivingly rotate the input gear 24. Thus, the arrow 27 represents the rotation direction as well as the direction of applied torque for the input gear 24.

The output gear 28 may be of any suitable type (e.g., a spur gear, a helical gear, a double helical gear, etc.). Also, the output gear 28 may rotate about an output axis of rotation 30. The axis of rotation 30 may be parallel and spaced apart from the axis of rotation 26 of the input gear 24. The output gear 28 may rotate counterclockwise as indicated by arrow 31 in FIG. 2. The output gear 28 may be fixed for rotation with an output hub (e.g., a wheel axle) such that torque of the output gear 28 is transferred to the output hub.

The idler gear 32 may be of any suitable type (e.g., a spur gear, a helical gear, a double helical gear, etc.). The idler gear 32 may include teeth that are enmeshed with teeth of the input gear 24 and teeth of the output gear 28. The idler gear 32 may rotate about an idler axis of rotation 34. The axis of rotation 34 may be parallel and spaced apart from both the input axis of rotation 26 and the output axis of rotation 30. The idler gear 32 may rotate clockwise as indicated by arrow 35. It will be appreciated that the gear train 22 may be referred to as an "idler set" because of the presence of the idler gear 32.

The drive assembly 20 may further include a housing 36 that encloses at least part of the gear train 22. The housing 36 may be a wall that extends about and encapsulates the gear train 22. The housing 36 may also be configured to contain a lubricant for the moving parts of the gear train 22.

In some embodiments, the idler gear 32 may be supported by and/or mounted for rotation relative to the housing 36. For example, the drive assembly 20 may include a support 38. In some embodiments, the support 38 may be elongate with a first end 40 and a second end 42 that are separated along a support axis 43. The idler gear 32 may be rotatably mounted (e.g., by a bearing) to the first end 40. The second end 42 of the support 38 may be fixed to the housing 36.

Accordingly, torque and power from the engine 18 may transfer from the input gear 24, through the idler gear 32, to the output gear 28 to drivingly rotate the output hub and the rear wheel 16a of the work vehicle 10. It will be appreciated that the gear train 22 may provide a predetermined gear reduction (i.e., gear ratio). Thus, the gear train 22 may convert the high speed and low torque rotation of the engine input shaft to lower speed and higher torque rotation of the wheel 16a. In other embodiments, the gear train 22 may provide speed increase such that the gear train 22 converts low speed and high torque rotation of the input gear 24 to higher speed and lower torque rotation of the output gear 28. It will be appreciated that the input gear 24, idler gear 32, and output gear 28 may include any suitable number of gear teeth for providing the predetermined gear ratio.

Figure 3:
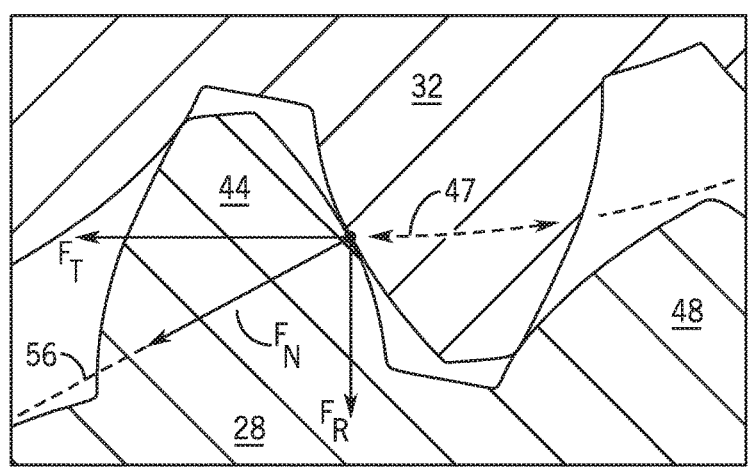
FIG. 3 is a detail view of two enmeshed gears of the drive assembly of FIG. 2.

Referring now to FIGS. 2 and 3, load transfer and transmission error (TE) occurring between the rotating idler gear 32 and the output gear 28 will now be discussed. For purposes of discussion, a first gear tooth 44 and an adjacent second gear tooth 48 of the output gear 28 are indicated. Additionally, a first gear tooth 46 of the idler gear 32 is indicated.

The first gear tooth 46 may be representative of the other gear teeth within the gear train 22. The first gear tooth 46 may have a particular profile, such as an involute gear tooth profile. The first gear tooth 46 may have various dimensions, which are known in the art and which will be referenced below. For example, a tooth thickness 47 (i.e., circular thickness) of the first gear tooth 46 is indicated in FIG. 3.

As the gears 28, 32 rotate, the first tooth 46 of the idler gear 32 enters between the first and second teeth 44, 48, progressively meshes and abuts the opposing involute surface of the first tooth 44 and eventually separates from the first tooth 44. This may be referred to as a "single tooth mesh" or "mesh of one tooth." This also represents the meshing of other teeth within the drive assembly 20. For example, the meshing behavior described in relation to the teeth 44, 46, 48 may also represent a tooth of the input gear 24 as it meshes with an opposing tooth of the idler gear 32.

As shown in FIG. 3, the idler gear 32 may apply a mesh force, $F_N$, to the output gear 28 along a line of action 56 during the mesh. Those having ordinary skill in the art will understand that the line of action 56 may be disposed at an angle 57 relative to a line 59 that is normal (i.e., perpendicular) to a line of centers 61 of the idler gear 32 and the output gear 28. The angle 57 is often referred to as the pressure angle (i.e., a working pressure angle) for the line of action 56.

As shown in the illustrated embodiment, the mesh force, $F_N$, has a radial component, $F_R$, as well as a tangential component, $F_T$. It will be appreciated that the tangential force $F_T$ causes the idler gear 32 to push and rotate the output gear 28 about the axis of rotation 30. Meanwhile, the radial force $F_R$ tends to press against the output gear 28 in a radial direction.

When the mesh force, $F_N$, is monitored over the time it takes to complete the single tooth mesh, it may be observed that the mesh force, $F_N$, varies slightly about a median force. The instantaneous mesh force, $F_N$, at different times during rotation may vary about that median force. In some embodiments, for example, the instantaneous mesh force, $F_N$, may vary substantially sinusoidally about the median.

The fluctuation may be at least partially due to what is known as transmission error (TE) forces. Generally, TE forces relate to the difference between a gear's actual position and the gear's position in an ideal case of perfect meshing. TE forces may be caused by torque loading on the gear, which cause deformation of the gear teeth. TE forces may also be caused by machining errors (profile and pitch error, eccentricity, etc.) and errors made during assembly.

TE forces may be a significant excitation mechanism for gear noise and vibration of the drive assembly 20. The TE forces may cause the gear train 22 to produce gear noise, vibration, whine, etc. The TE forces may be transferred to the bearings that support the gears 24, 28, 32. This may cause excitation of the housing 36, and cause noise, vibration, whine, and the like.

Figure 4:
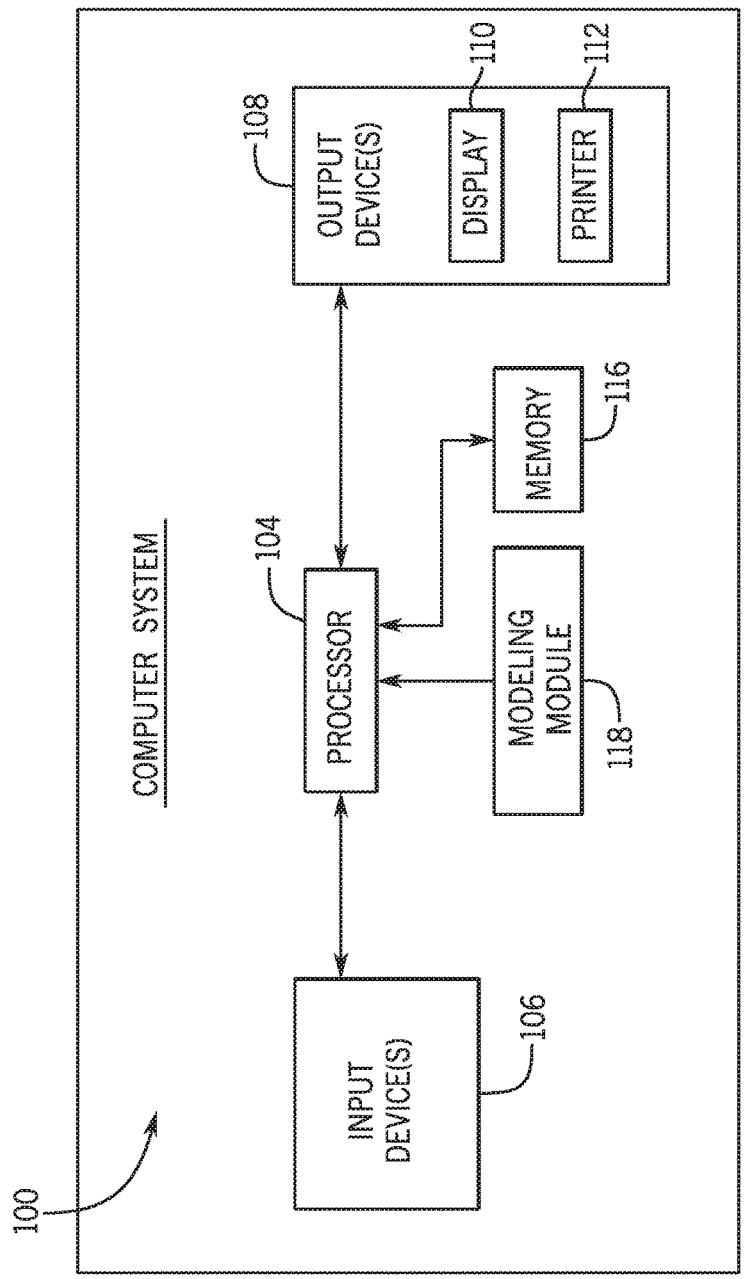
FIG. 4 is a schematic view of a tool that is embodied as a computer system and that is configured for designing the gearbox assembly of FIG. 2.

The present disclosure provides a tool and a method, such as a computerized tool 100 illustrated in FIG. 4 and a related design method 200, for analyzing, designing, and/or improving a gear train based on one or more analyses of the TE forces created during rotation of the gear train. The tool 100 and its methods 200 of use may be employed for reducing noise, vibration, whine, and other types of frequencies caused by TE.

As will be discussed, the tool 100 and its method 200 may be used to analyze TE forces of two or more different configurations of the gear train 22. One or more variables can be different in each configuration of the gear train 22 and TE forces for each may be analyzed. The TE forces for each of the different configurations can be compared to determine which configuration provides the most desirable acoustic qualities and/or vibrational frequencies for the drive assembly 20.

In some embodiments, the tool 100 may be used for designing an idler gear set (i.e., the gear train 22 includes an idler gear 32). The tool 100 may be used to analyze TE forces at the idler gear 32. For example, the summation of the TE forces at the idler gear 32 may be analyzed. Accordingly, the TE forces within the gear train 22 may be managed. For example, the tool 100 may be used for phasing of the TE force vectors within the gear train 22.

In some embodiments, a design variable for one of the gears may be determined using the tool 100. Specifically, a design variable for the idler gear 32 may be determined. In some embodiments, the number of teeth for the idler gear 32 may be determined using the tool 100. Also, in some embodiments, the position of the idler gear 32 relative to the input gear 24 and the output gear 28 (and, thus, the pressure angle 57) for the idler gear 32 may be determined using the tool 100. Additionally, in some embodiments, the tooth thickness 47 of the idler gear 32 may be determined using the tool 100.

In the discussion of the computerized tool 100 of the present disclosure, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the computer tool 100 and its methods of use may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely example embodiments of the present disclosure.

Conventional techniques related to signal processing, data transmission, signaling, control, and other functional aspects of the systems (and the individual operating components of the systems) may not be described in detail herein for brevity. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As will be appreciated by one skilled in the art, certain aspects of the disclosed subject matter may be embodied as a method, system, or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that may contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Aspects of certain embodiments are described herein may be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block (or otherwise described herein) may occur out of the order noted in the figures. For example, two blocks shown in succession (or two operations described in succession) may, in fact, be executed substantially concurrently, or the blocks (or operations) may sometimes be executed in the reverse order, depending upon the functionality involved. It will also be noted that each block of any block diagram and/or flowchart illustration, and combinations of blocks in any block diagrams and/or flowchart illustrations, may be implemented by special purpose hardware-based systems that perform the specified functions or acts, or combinations of special purpose hardware and computer instructions.

As shown in FIG. 4, the computerized tool 100 may include a generally include a processor 104, one or more input devices 106, one or more output devices 108, computerized memory 116, and a modeling module 118. These components may be suitably configured to support operation of the computerized tool 100 as well as the method 200 of FIG. 5 and/or other features of the present disclosure. It will be understood that FIG. 4 is a simplified representation of the tool 100 for purposes of explanation and ease of description, and FIG. 4 is not intended to limit the application or scope of the subject matter in any way. Practical embodiments of the tool 100 may vary from the illustrated embodiment without departing from the scope of the present disclosure. Also, the tool 100 may include numerous other devices and components for providing additional functions and features, as will be appreciated in the art.

The processor 104 of the computer tool 100 generally represents the hardware, software, and/or firmware components configured to facilitate communications and/or interaction between the input device(s) 106, output device(s) 108, memory 116, and modeling module 118. The processor 104 may also perform additional tasks and/or functions described in greater detail below. Depending on the embodiment, the processor 104 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processor 104 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processor 104 includes processing logic that may be configured to carry out the functions, techniques, and processing tasks associated with the operation of the tool 100. Furthermore, the steps of a method or algorithm described in connection with the embodiments disclosed herein may be embodied directly in hardware, in firmware, in a software module executed by the processor 104, or in any practical combination thereof.

The input device(s) 106 may be of any suitable type with which the user (e.g., a gear designer) may enter user commands. For example, in some embodiments, the input device 106 may be realized as a keyboard, a mouse, a touch-sensitive surface, a stylus, and/or other input device. As will be discussed, the user may enter values for certain variables when analyzing different configurations of gear trains 22.

The output device(s) 108 may be of any suitable type for providing output to the user. In some embodiments, the output devices 108 may be realized by a display 110 and/or a printer 112. The display 110 may provide visual output on an electronic screen, from a projector, etc. The printer 112 may provide visual output as well; however, the printer 112 may provide hardcopies (e.g., paper copies) of the output.

The memory 116 may be realized as RAM memory, flash memory, EPROM memory, EEPROM memory, registers, a hard disk, a removable disk, a CD-ROM, or any other form of storage medium known in the art. In this regard, the memory 116 can be coupled to the processor 104 such that the processor 104 can read information from, and write information to, the memory 116. In the alternative, the memory 116 may be integral to the processor 104. As an example, the processor 104 and the memory 116 may reside in an ASIC. In practice, a functional or logical module/component of the display 110 might be realized using program code that is maintained in the memory 116.

Furthermore, the modeling module 118 may be coupled to the processor 104 and/or other components of the tool 100. The modeling module 118 may be configured for generating a computer model that represents the gear train 22 described above and/or other gear trains. With the modeling module 118, the computerized tool 100 may be configured to generate and analyze such models of the gear train 22. In some embodiments, the modeling module 118 may be used to analyze TE forces of the modeled gear train 22. Also, the modeling module 118 may be used to provide output related to these models.

Figure 5:
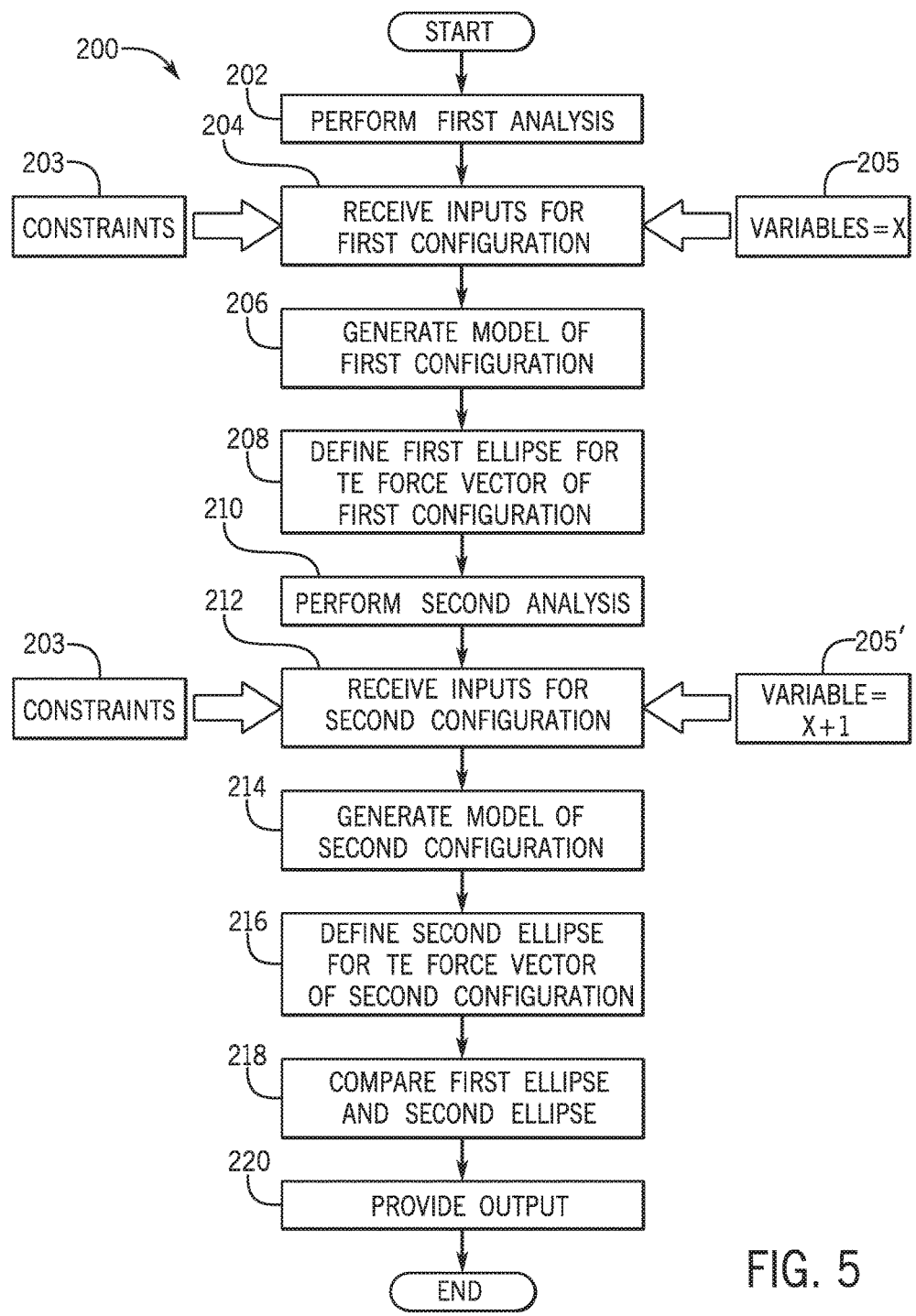
FIG. 5 is a flowchart illustrating a method of designing a drive assembly using the tool of FIG. 4.

FIG. 5 illustrates an embodiment of a method 200 of operating the modeling module 118 and other features of the computerized tool 100. As shown, the method 200 may begin at 202, wherein a first gear train analysis is performed. More specifically, at 204, the modeling module 118 receives inputs for a first configuration of the gear train 22. The inputs may be those input by the user via the input device 106.

The modeling module 118 may generate the model based on certain constraints 203 that are input from the user. The constraints 203 input by the user may include the gear ratio for the gear train 22, the relative position of the input axis of rotation 26 and the output axis of rotation 30 for the gear train 22, the number of gears within the gear train 22, the general arrangement of the gears within the gear train 22, the available space (i.e., the envelope) for the gear train 22 within the housing 36, and/or other constraints. Manufacturing considerations may also present one or more constraints 203 for the gear train 22, and these constraints 203 may be input at 204 of the method 200.

The input received at 204 may also include one or more design variables 205. The design variables 205 may include the number of gear teeth for the idler gear 32. The design variables 205 may also include the tooth thickness 47 of the idler gear 32. Furthermore, the design variables 205 may include the position of the idler gear 32 relative to the input and output gears 24, 28 (i.e., the pressure angles of the idler gear 32).

In one example, data representing an existing gear train 22 may be input at 204. This data may represent a baseline configuration of the gear train 22. Other configurations of the gear train 22 may be compared to this baseline configuration as will be discussed.

Next, at 206, a model of the gear train 22 may be generated according to the input received at 204. FIGS. 6A through 6D represents an example embodiment of such a model 99. As shown virtual representations of the input gear 24, output gear 28 and idler gear 32 may be generated within the model 99. In some embodiments, the model 99 may be output via the display 110 and/or the printer 112.

Figure 6C:
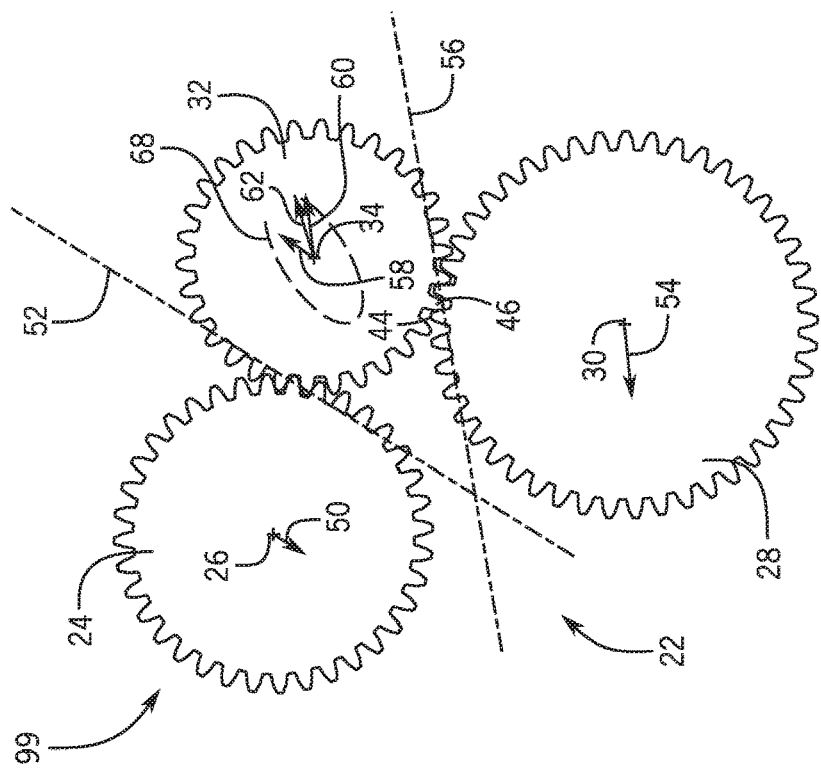
Figure 6D:
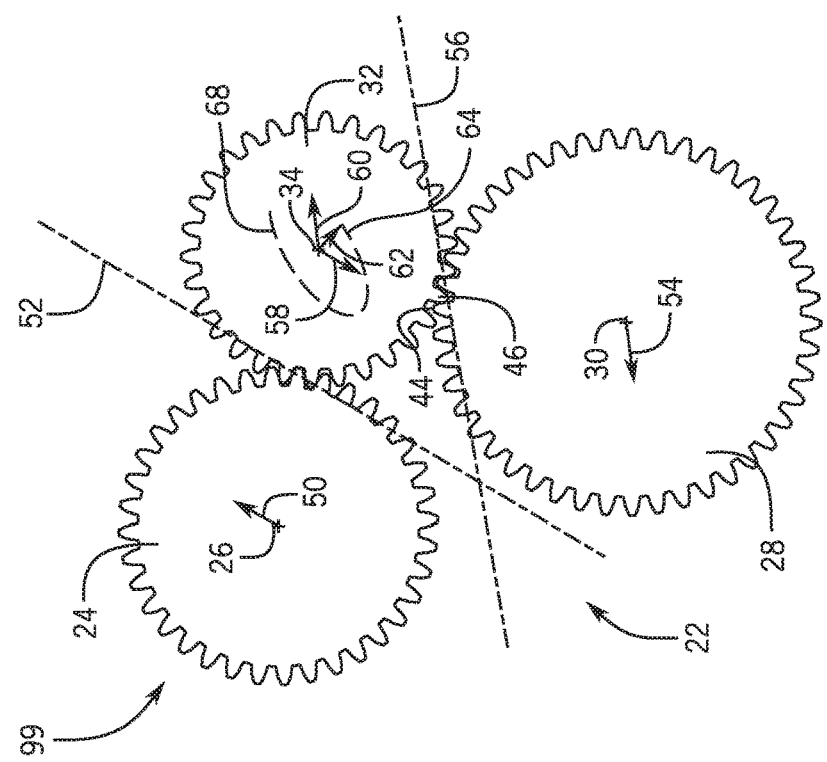

The meshing of gear tooth 46 against gear tooth 44 is indicated in FIGS. 6A-6D for reference purposes. The angular position of the gears 24, 28, 32 changes progressively from FIG. 6A to FIG. 6D. Specifically, FIG. 6A shows a first angular position of the gears 24, 28, 32, FIG. 6B shows a subsequent second angular position of the gears, 24, 28, 32, FIG. 6C, shows a subsequent third angular position of the gears 24, 28, 32, and FIG. 6D shows a subsequent fourth angular position of the gears 24, 28, 32. FIGS. 6A-6D may represent a single tooth meshing of the gears 24, 28, 32 (e.g., the initial contact of tooth 46 with tooth 44 and the meshing between the teeth 46, 44 up to the time at which the teeth 46, 44 separate from each other).

The model 99 may represent the dynamic behavior of the gear train 22 during rotation. More specifically, the model 99 may represent the TE forces acting within the gear train 22 during the single tooth meshing of the gear train 22. The model 99 may be utilized to perform an analysis of the TE force characteristics of the gears 24, 28, 32 of the gear train 22.

At the first angular position of FIG. 6A, the TE force at the input gear 24 is represented by TE force vector 50, which extends from the axis of rotation 26, and which is directed parallel to the line of action 52. The processor 104 may determine how the TE force vector 50 changes as the gears 24, 28, 32 rotate as shown in FIGS. 6B, 6C, and 6D. The processor 104 may also determine the equal and opposite reaction force at the idler gear 32, as represented by an input reaction force vector 58.

Likewise, the TE force at the output gear 28 is represented by TE force vector 54, which extends from the axis of rotation 30, and which is directed parallel to the line of action 56. The processor 104 may determine how the TE force vector 54 changes as the gears 24, 28, 32 rotate as shown in FIGS. 6B, 6C, and 6D. The processor 104 may also determine the equal and opposite reaction force at the idler gear 32, as represented by an output reaction force vector 60.

In generating the model 99, the processor 104 may determine a vector sum of the TE forces at the idler gear 32 (i.e., the combination of the input reaction force vector 58 and the output reaction force vector 60). The vector sum may be represented by a vector sum line 62, which extends from the axis of rotation 34, and which terminates at an end 64. The processor 104 may determine how the vector sum changes as the gears 24, 28, 32 rotate.

Those having ordinary skill in the art will understand that the processor 104 may calculate, determine, identify, and/or provide the TE force vectors 50, 54, 58, 60 and the vector sum 62 in various ways using certain equations, mathematical formulas, etc. For example, the TE force vectors 50, 54, 58, 60 and vector sum 62 may be calculated according to "A Mathematical Programming Technique for the Evaluation of Load Distribution and Optimal Modifications for Gear Systems," Journal Eng. for Industry, 95(4), 1115-1122, November 1973, which is incorporated by reference in its entirety.

The method 200 may continue at 208, in which the processor 104 provides a geometric representation of the TE characteristics of the gear train 22. For example, in the illustrated embodiment, the vector sum line 62 rotates and sweeps about the axis of rotation 34 during the single tooth mesh. The end 64 of the vector sum line 62 traces a line 68, which forms the geometric representation of the TE force at the idler gear 32. In the embodiment shown, the line forms a substantially elliptical shape.

Figure 7:
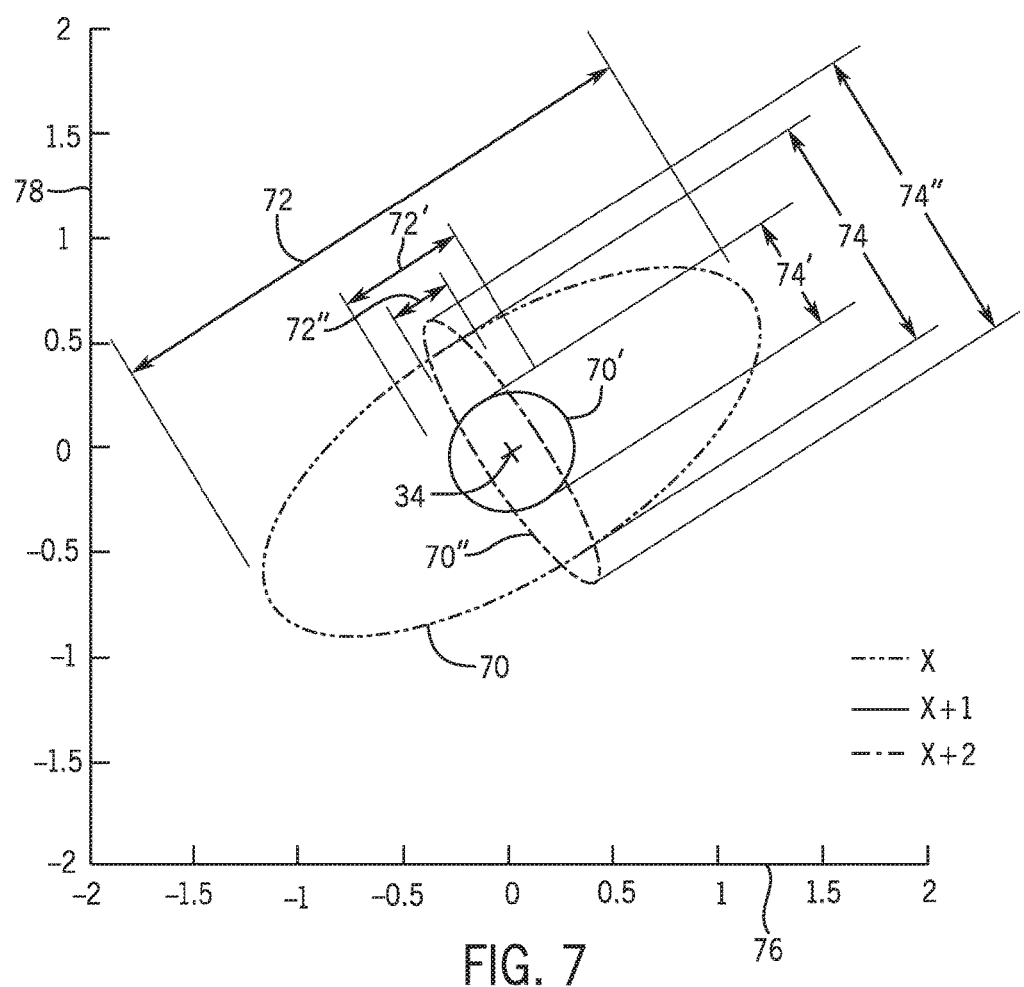
FIG. 7 is a graph illustrating a plurality of geometric representations of a respective transmission error force for alternative gear configurations for the drive assembly of FIG. 2.

As shown in FIG. 7, the tool 100 may plot a corresponding ellipse 70 on a coordinate system. (The ellipse 70 is indicated with the line labelled "X".) In FIG. 7, the coordinate system includes an X-axis 76 and a Y-axis 78. The ellipse 70 may be centered at the X=0 and Y=0 point and may include a first axis 72 and a second axis 74.

The method 200 may continue at 210, wherein a second analysis of the gear train 22 is performed. The second analysis may be similar to the first analysis of 202, 204, 206, and 208. However, the gear train 22 may be configured differently in the second analysis.

For example, at 212, inputs may be received for defining the second configuration of the gear train 22. The constraints 203 may be similar to those received at 204. However, one or more of the variables 205' may be changed. For example, at 212, the number of gear teeth for the idler gear 32 may be different from that entered at 204. Likewise, at 212, the tooth thickness 47 of the idler gear 32 may be different. Furthermore, at 212, the pressure angle 57 of the idler gear 32 may be different.

Then, at 214, the modeling module 118 may generate a model of the gear train 22 in this second configuration. Also, the processor 104 may determine the TE force vectors within the gear train 22 (including the TE vector sum at the idler gear 32) using the model of the second configuration.

Next, at 216, the tool 100 may generate a second ellipse 70' representing the TE forces at the idler gear 32. The second ellipse 70' may be plotted on the coordinate system as shown in FIG. 7. (The second ellipse 70' is indicated with the line labelled "X+1".) The second ellipse 70' may have a first axis length 72' and a second axis length 74'.

The ellipses 70, 70' provide useful mathematical data that can be used to compare the TE forces in the different configurations of the gear train 22. For example, the dimensions of the ellipses 70, 70' may be compared mathematically at 218 of the method 200.

In some embodiments, at 218, the processor 104 may calculate the root sum of squares of the first ellipse 70 according to:

$$RSS_o = \sqrt{(1staxis)^2 + (2ndaxis)^2} \quad (1)$$

As shown in FIG. 7, the first axis of the first ellipse 70 is indicated at 72 and the second axis is indicated at 74.

Then, the processor 104 may calculate the root sum of squares of the second ellipse 70' according to:

$$RSS = \sqrt{(1staxis)^2 + (2ndaxis)^2} \quad (2)$$

As shown in FIG. 7, the first axis of the second ellipse 70 is indicated at 72' and the second axis is indicated at 74'.

Additionally, the processor 104 may compare the first ellipse 70 to the second ellipse 70' according to:

$$dB = 20 \log(RSS/RSS_0) \quad (3)$$

It will be appreciated that this equation (3) provides a numerical value that represents the relative size of the second ellipse 70' compared to the first ellipse 70. In other words, the calculation using equation (3) determines whether the second ellipse 70' is smaller than the first ellipse 70 (indicating lower amplitude dynamic forces that would be transferred to the housing 36 and less noise) or whether the second ellipse 70' is larger than the first ellipse 70 (indicating higher amplitude dynamic forces that would be transferred to the housing 36 and more noise).

In this example, the first ellipse 70 is acting as a baseline from which the second ellipse 70' may be compared. In other words, the TE forces of the first configuration of the gear train 22 (represented by first ellipse 70) may be compared to the TE forces of the second configuration of the gear train 22 (represented by second ellipse 70'). This comparison identifies whether the second configuration produces improved vibrational frequencies compared to the first configuration of the gear train 22.

The method 200 may continue at 220, wherein the tool 100 outputs various results using the display 110, the printer 112, and/or other output devices 108. As mentioned, the ellipses 70, 70' may be plotted as shown in FIG. 7 on the display 110 and/or the printer 112. As shown in FIG. 7, the ellipses 70, 70' may be plotted together on the same coordinate system so that the TE forces of the different gear train configurations may be visually compared. In the embodiment illustrated in FIG. 7, for example, the second ellipse 70' is smaller than the first ellipse 70 (i.e., the second ellipse 70' is enclosed by the first ellipse 70). This demonstrates that the TE forces in the second configuration of the gear train 22 result in vector sum forces that are less than the first configuration. In other words, because the first ellipse 70 is larger than the second ellipse 70', it is evident that the TE forces of the first configuration are greater than those of the second configuration.

In additional embodiments of 220 of the method 200, the tool 100 outputs other information relating to the comparison performed at 218. For example, the comparison may be collected in a spreadsheet, table, etc. In some embodiments, the tool 100 generates a spreadsheet listing each configuration of the gear train 22, the variables 205 included for each configuration (at 204 and 212 of the method 200), and the calculated values of equation (3) from above. Thus, with the spreadsheet data, the tool 100 and/or the user would be able to choose the configuration of the gear train 22 that is expected to produce the least amount of noise.

From this data, the processor 104 may also identify and determine design variables for the gear train 22. This may be determined based, at least partly, on the comparison of the first and second ellipses 70, 70'. For example, the number of teeth for the idler gear 32, the tooth thickness 47 of the idler gear 32, and/or the pressure angle of the idler gear 32 may be determined based on the comparison of the ellipses 70, 70' performed at 218. In some embodiments, for example, if the comparison at 218 reveals that the variables 205' for the second configuration cause the gear train 22 to produce less noise than the first configuration, then the processor 104 may indicate that those variables 205' are more effective at reducing noise. Thus, the second configuration may be chosen over the first configuration.

In addition, the comparison 218 and/or the output provided at 220 may reveal the relative orientation of the TE force ellipse during rotation of the gears. For example, a third ellipse 70" is included in FIG. 7. The third ellipse 70" may be provided by modeling a third configuration of the gear train 22. This is not explicitly illustrated in the flowchart of 5; however, it will be understood that the third ellipse 70" may be provided by inputting a different set of variables (variables=X+2) for the gear train 22. Then, a model of the third configuration of the gear train 22 may be formed as described above. From the model, the processor 104 may define the third ellipse 70". Additionally, the third ellipse 70" may be plotted with the other ellipses 70, 70'.

The orientation of the ellipses 70, 70', 70" may be compared against each other. As shown, the third ellipse 70" of the third configuration is oriented approximately ninety degrees (90°) away from the first ellipse 70. This relative orientation may be useful, for example, when designing the housing 36 and/or the support 38 of the drive assembly 20. For example, the major axis (i.e., axis 72) of the first ellipse 70 is oriented substantially parallel to the axis 43 of the support 38 of FIG. 2. In contrast, the major axis (i.e., axis 74") of the third ellipse 70" is oriented substantially perpendicular to the axis 43 of the support 38. This reveals that the third configuration of the gear train 22 may produce less noise than the first configuration of the gear train 22. This is because, in the third configuration, the TE forces would have less tendency to transfer through the support 38 and vibrate the housing 36.

Figure 8:
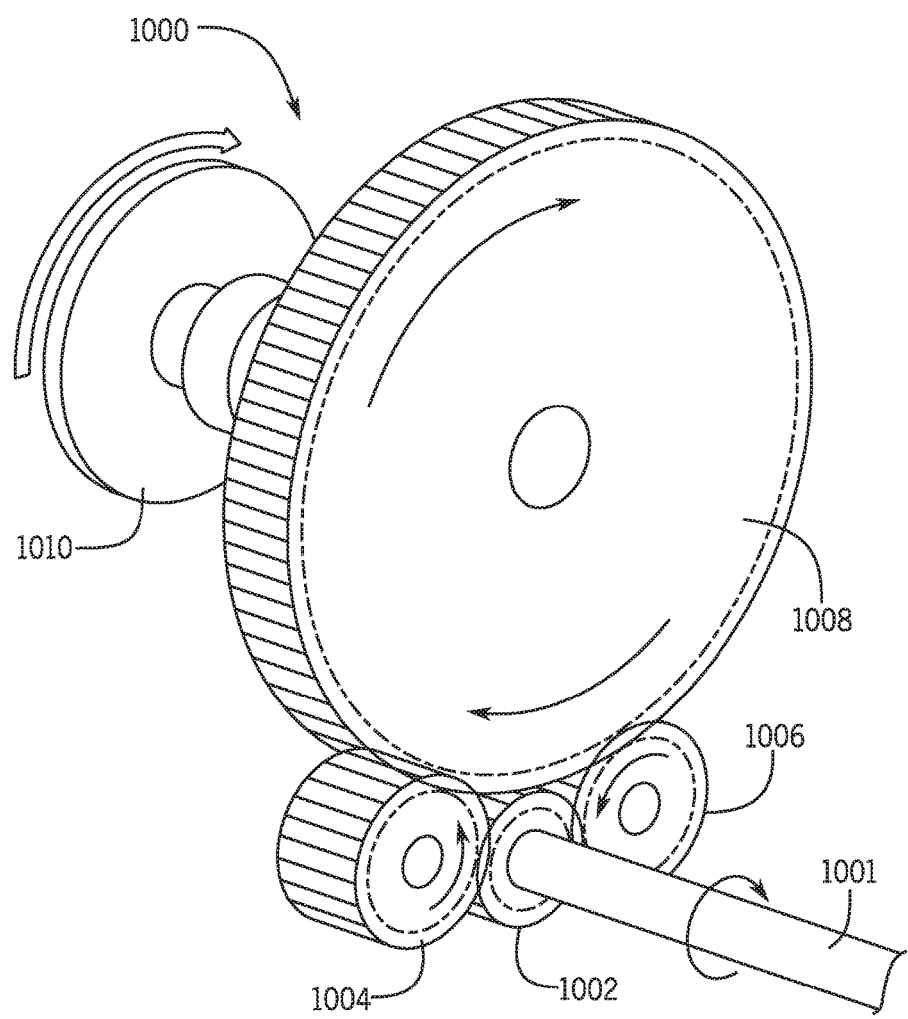
FIG. 8 is a perspective view of a gear train for a final drive assembly of a work vehicle, such as the work vehicle of FIG. 1.

It will be appreciated that the tool 100 and method 200 may be used when designing a variety of gear trains. As another example, FIG. 8 illustrates another gear train 1000 that may be modeled and analyzed using the tool 100 and method 200 described above. In this embodiment, the gear train 1000 includes a sun gear 1002, a first idler gear 1004, a second idler gear 1006, and a bull gear 1008. The sun gear 1002 may be fixed for rotation with an input shaft 1001. The bull gear 1008 may be fixed for rotation with an output hub 1010 (e.g., a wheel axle).

The tool 100 and method 200 may be employed for modeling and analyzing different configurations of the gear train 1000. Similar to the above embodiments, a model may be formed with the gears 1002, 1004, 1006, 1008 configured according to a first set of variables (number of gear teeth, pressure angle, and tooth thickness). Then, the TE force vector sums may be identified. Next, ellipses representing the TE force vector sums during a single tooth mesh may be generated. In this embodiment, each of the four gears 1002, 1004, 1006, 1008 are in mesh with two others; therefore, there are four TE force ellipses to consider (i.e., one for each gear). Subsequently, a second model may be formed with the variable(s) set at different values and a second set of ellipses may be generated. More configurations may be modeled as well and respective ellipses may be generated therefrom. Then, the ellipses of the different configurations may be compared as discussed above. In some embodiments, the configuration that produces the smallest ellipses may be chosen as the final design configuration. In additional embodiments, the configuration that produces ellipses in a desirable orientation may be chosen for as the final design configuration. In either case, the comparison of the ellipses allows the TE forces to be managed, for example, to reduce noise during operation of the gear train 1000.

Accordingly, the tool 100 and its method 200 of use may provide a convenient, useful, and accurate way of predicting TE force interactions within a particular configuration of a gear train. Thus, the teachings of the present disclosure help facilitate gear design.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A method for designing a gear train, the method comprising:
   generating, with a modeling module, a model of a gear train in the form of an idler gear set having a first gear enmeshed with a second gear and a third gear;
   inputting, with an input device, a first variable to define a first configuration of the first and second gears in the gear train;
   performing, with a processor, a first analysis of the first configuration, the first analysis including determining a first transmission error (TE) characteristic of the first configuration of the first and second gears;
   inputting, with the input device, a second variable to define a second configuration of the first and second gears in the gear train;
   performing, with the processor, a second analysis of the second configuration, the second analysis including determining a second TE characteristic of the second configuration of the first and second gears; and providing, with the processor, a comparison of the first TE characteristic and the second TE characteristic;

wherein the performing the first analysis includes providing a first geometric representation of the first TE characteristic including determining a change in a first vector sum of a TE force from the second gear and a TE force from the third gear during rotation of the idler gear set in the first configuration;

wherein performing the second analysis includes providing a second geometric representation of the second TE characteristic including determining a change in a second vector sum of the TE force from the second gear and the TE force from the third gear during rotation of the idler gear set in the second configuration; and wherein providing a comparison of the first TE characteristic and the second TE characteristic includes providing a comparison of the first and second geometric representations.

2. The method of claim 1, further comprising determining a design variable for the first gear based, at least partly, on the comparison of the first and second geometric representations.

3. The method of claim 2, wherein determining the design variable includes at least one of:
determining a number of teeth of the first gear;
determining a tooth thickness of the first gear; and
determining a pressure angle of the first gear.

4. The method of claim 2, wherein determining the design variable includes determining the design variable according to a comparative size of the first and second geometric representations.

5. The method of claim 2, wherein determining the design variable includes determining the design variable according to a comparative orientation of the first and second geometric representations.

6. The method of claim 1, wherein the first geometric representation is a first ellipse having a first axis, X, and a second axis, Y;
wherein the second geometric representation is a second ellipse having a first axis, A, and a second axis, B;
further comprising comparing the first and second ellipses by:
calculating a first root sum of squares for the first ellipse according to:

$$RSS_o = \sqrt{(X)^2 + (Y)^2};$$

calculating a second root sum of squares for the second ellipse according to:

$$RSS = \sqrt{(A)^2 + (B)^2}; \text{ and}$$

calculating a comparison, dB, of RSS and $RSS_0$ according to:

$$dB = 20 \log(RSS/RSS_0).$$

7. The method of claim 1, wherein the first geometric representation is a first ellipse and wherein the second geometric representation is a second ellipse;
further comprising plotting the first ellipse and a second ellipse on a coordinate system.

8. The method of claim 7, further comprising at least one of:
displaying the plot of the first and second ellipses on a display; and
generating a hard copy of the plot of the first and second ellipses.

9. A computerized tool for designing a gear train in the form of an idler gear set having a first gear enmeshed with a second gear and a third gear, the computerized tool comprising:
an input device configured to receive a first user input related to a first configuration of the gear train and to receive a second user input related to a second configuration of the gear train;
a modeling module configured to generate a model of the first configuration of the gear train and to generate a model of the second configuration of the gear train; and
a processor configured to perform a first analysis of the first configuration by determining a first transmission error (TE) characteristic of the first configuration of the gear train and providing a first geometric representation of the first TE characteristic, wherein the processor is configured to determine a change in a first vector sum of a TE force from the second gear and a TE force from the third gear during rotation of the idler gear set in the first configuration;
wherein the processor is configured to perform a second analysis of the second configuration by determining a second TE characteristic of the second configuration of the gear train and providing a second geometric representation of the second TE characteristic, wherein the processor is configured to determine a change in a second vector sum of the TE force from the second gear and the TE force from the third gear during rotation of the idler gear set in the second configuration; and
wherein the processor is configured to compare the first TE characteristic and the second TE characteristic by providing a comparison of the first and second geometric representations.

10. The computerized tool of claim 9, wherein the processor is configured to identify a design variable for the first gear based, at least partly, on the comparison of the first and second geometric representations.

11. The computerized tool of claim 10, wherein the processor is configured to identify at least one of:
a number of teeth of the first gear;
a tooth thickness of the first gear; and
a pressure angle of the first gear.

12. The computerized tool of claim 10, wherein the processor is configured to compare a relative size of the first and second geometric representations.

13. The computerized tool of claim 10, wherein the processor is configured to compare a relative orientation of the first and second geometric representations.

14. The computerized tool of claim 9, wherein the first geometric representation is a first ellipse having a first axis, X, and a second axis, Y;
wherein the second geometric representation is a second ellipse having a first axis, A, and a second axis, B;
wherein the processor is configured to compare the first and second ellipses by:
calculating a first root sum of squares for the first ellipse according to:

$$RSS_o = \sqrt{(X)^2 + (Y)^2};$$

calculating a second root sum of squares for the second ellipse according to:

$$RSS = \sqrt{(A)^2 + (B)^2}; \text{ and}$$

calculating a comparison, dB, of RSS and RSS0 according to:

$$dB = 20 \log(RSS/RSS_0).$$

15. The computerized tool of claim 9, wherein the first geometric representation is a first ellipse and wherein the second geometric representation is a second ellipse;

further comprising at least one output device that is configured to output the first ellipse and a second ellipse on a coordinate system.

16. The computerized tool of claim 15, wherein the output device is at least one of:

a display configured to display the plot of the first and second ellipses; and a printer configured to generate a hard copy of the plot of the first and second ellipses.

\* \* \* \* \*

UNITED STATES PATENT AND TRADEMARK OFFICE
CERTIFICATE OF CORRECTION

PATENT NO. : 10,423,756 B2
APPLICATION NO. : 15/337649
DATED : September 24, 2019
INVENTOR(S) : Robert J. White Page 1 of 1

It is certified that error appears in the above-identified patent and that said Letters Patent is hereby corrected as shown below:

In the Claims

In Column 14, Claim 1, Line 51, delete "of a gear" and insert -- of the gear --, therefor.

In Column 15, Claim 1, Line 17, delete "a comparision" and insert -- the comparision --, therefor.

In Column 15, Claim 7, Lines 60-61, delete "a second ellipse" and insert -- the second ellipse --, therefor.

In Column 16, Claim 14, Lines 65-66, delete "and RSS0 according" and insert -- and $RSS_0$ according --, therefor.

In Column 17, Claim 15, Lines 5-6, delete "a second ellipse" and insert -- the second ellipse --, therefor.

Signed and Sealed this
Fourteenth Day of January, 2020

Andrei Iancu
*Director of the United States Patent and Trademark Office*